(12) United States Patent
Fu et al.

(10) Patent No.: US 7,820,724 B2
(45) Date of Patent: Oct. 26, 2010

(54) COLLOIDAL TITANIUM DIOXIDE SOLS

(75) Inventors: Guoyi Fu, Ellicott City, MD (US); BillieJo M. Monk, Glen Rock, PA (US)

(73) Assignee: Millennium Inorganic Chemicals, Inc., Hunt Valley, MD (US)

( * ) Notice: Subject to any disclaimer, the term of this patent is extended or adjusted under 35 U.S.C. 154(b) by 0 days.

(21) Appl. No.: 12/031,425

(22) Filed: Feb. 14, 2008

(65) Prior Publication Data

US 2009/0209665 A1 Aug. 20, 2009

(51) Int. Cl.
*C09K 21/00* (2006.01)
*C09C 1/62* (2006.01)

(52) U.S. Cl. .......................... 516/90; 428/702; 502/170

(58) Field of Classification Search .................... 516/90
See application file for complete search history.

(56) References Cited

U.S. PATENT DOCUMENTS

| 3,001,854 A | 9/1961 | Kenworthy et al. |
| 4,317,778 A | 3/1982 | Blum et al. |
| 4,351,773 A | 9/1982 | Milberger et al. |
| 4,374,043 A | 2/1983 | Blum et al. |
| 5,821,192 A | 10/1998 | Seely et al. |
| 5,840,111 A * | 11/1998 | Wiederhoft et al. ......... 106/436 |
| 6,420,437 B1 * | 7/2002 | Mori et al. .................... 516/90 |
| 6,627,336 B1 | 9/2003 | Ohmori et al. |
| 6,737,485 B1 | 5/2004 | St. Clair et al. |
| 6,824,826 B1 | 11/2004 | Amadelli et al. |
| 7,144,840 B2 | 12/2006 | Yeung et al. |
| 2003/0109589 A1 | 6/2003 | Chane-Ching |
| 2004/0241502 A1 | 12/2004 | Chung et al. |
| 2006/0254461 A1 | 11/2006 | Hong et al. |

FOREIGN PATENT DOCUMENTS

| JP | 08208228 | | 8/1996 |
| KR | 10-2002-0043133 | * | 8/2002 |
| WO | PCT/US08/72125 | | 8/2008 |

OTHER PUBLICATIONS

U.S. Appl. No. 11/848,967, Fu.

* cited by examiner

*Primary Examiner*—Ling-Siu Choi
*Assistant Examiner*—Chun-Cheng Wang
(74) *Attorney, Agent, or Firm*—Dunlap Codding, P.C.

(57) ABSTRACT

Stable, translucent or transparent titanium dioxide sols comprising amorphous titanium dioxide and an organic peptizing agent are provided that are useful in particulate binding applications. Also provided are methods for preparing the inventive sols. The inventive sols are prepared from titanium dioxide precursors including organotitanium compounds and water-soluble titanium salts that are treated to precipitate amorphous titanium dioxide. The amorphous titanium dioxide is re-dispersed and peptized to form a translucent or transparent mixture. The inventive sols are stable for an extended period of time.

29 Claims, No Drawings

COLLOIDAL TITANIUM DIOXIDE SOLS

FIELD OF INVENTION

The present invention relates to stable, colloidal titanium dioxide sols and methods of preparing these sols. More particularly, the invention relates to stable, transparent titanium dioxide sols comprising amorphous titanium dioxide.

BACKGROUND OF THE INVENTION

In many applications, particulate binders are needed to hold components together for improved processability, mechanical stability, adhesion properties and to enhance performance of the components. For example, U.S. Pat. Nos. 4,317,778, 4,351,773 and 4,374,043 describe the production of vanadium phosphate (VPO) catalysts for hydrocarbon oxidation in which silica sol is used to bind VPO particles to increase attrition resistance of the catalysts.

In certain surface coating and printing applications, particulate binding agents are used to enhance the mechanical stability of a coating or printing element and the adhesion of the element to the substrate surface.

Silica ($SiO_2$) is typically used for these applications rather than titanium dioxide. On reason may be that silica particles are normally amorphous whereas titanium dioxide is typically a crystalline material. Amorphous particles characteristically contain a high concentration of hydroxyl groups on the surface, which provide a large number of active sites on the surface of the particles, resulting in strong binding to other surfaces. In contrast, titanium dioxide is typically present as a crystalline solid with lower binding properties.

However, there are advantages to using titanium dioxide rather than silica in binding applications. For example, titanium dioxide is more stable chemically than silica, and titanium dioxide is photoactive and is more active catalytically. For this reason, titanium dioxide is used for surface coating applications where photocatalytic properties are useful.

Titanium dioxide is typically produced commercially in two crystal phases, rutile and anatase, that differ in lattice structures, refractive indices, and densities. The rutile phase is the more stable phase and is favored for use in pigment applications because rutile pigments have a higher refractive index than their anatase counterparts, resulting in greater opacity and whiteness.

The anatase form of titanium dioxide is usually more photoactive than the rutile form and is typically used for photocatalytic applications. When exposed to light, the photoactive titanium dioxide forms reactive species which can degrade $NO_x$ and volatile organic compounds (VOCs) that come into contact with the photocatalytic material. In view of these properties, photocatalytic titanium dioxide has been employed in coatings to remove pollutants from the environment. Such coatings may also have the advantage of being self-cleaning since soil (grease, mildew, mold, algae, etc.) is also oxidized on the surface.

U.S. Patent Application Publication No. US 2004/0241502 to Chung et al., which is hereby incorporated by reference, describes neutral and transparent titanium dioxide colloid sols and a method of manufacturing the sols. The publication discloses that the titanium dioxide particles used in the sols is in the anatase form. The sols described contain 1-5% titanium dioxide by weight of the mixture.

U.S. Pat. No. 6,824,826 to Amadelli et al., which is hereby incorporated by reference, describes the preparation of colloidal $TiO_2$ which may be doped with a metal chosen from the group I-VA, and the lanthanide and actinide series for coating on cementitious stone and marble products. The colloidal titanium dioxide is produced by hydrolysis of a $TiO_2$ precursor in dilute nitric acid.

U.S. Pat. No. 6,627,336 to Ohmori et al., which is hereby incorporated by reference, describes an aqueous dispersion of finely divided titanium dioxide comprising chloride ion and at least one Bronsted base selected from pyrophosphate, metaphosphate, polyphosphate, methanesulfonate, ethanesulfonate, dodecylbenzenesulfonate and propanesulfonate.

U.S. Pat. No. 6,737,485 to St. Clair et al., which is hereby incorporated by reference, describes stabilized dispersions formed from titanium chelate polymer and a process to prepare the stabilized dispersions of titanium chelate polymer. The dispersion is stabilized by various stabilizing compounds including hydroxyacids.

U.S. Pat. No. 6,420,437 to More et al., which is hereby incorporated by reference, discloses neutral titanium dioxide colloid sol said to have high stability in a neutral pH range and is capable of forming a colorless transparent coating.

Therefore, there exists a need for stable, translucent or transparent titanium dioxide sols comprising amorphous titanium dioxide that will combine the superior stability and photocatalytic activity of titanium dioxide with the desirable binding properties of an amorphous solid.

The foregoing discussion is presented solely to provide a better understanding of nature of the problems confronting the art and should not be construed in any way as an admission as to prior art nor should the citation of any reference herein be construed as an admission that such reference constitutes "prior art" to the instant application.

SUMMARY OF THE INVENTION

Colloidal sols comprising amorphous titanium dioxide with excellent binding properties are provided that are useful for many applications including as surface coating formulations and in printing applications. The sols are transparent or translucent and stable for extended periods of time. Also provided herein are processes for the preparation of the inventive titanium dioxide sols.

A stable colloidal titanium dioxide sol is provided comprising amorphous titanium dioxide particles. In one embodiment, the inventive sols comprise titanium dioxide particles with an average particle size of less than 50 nm, an organic peptizing agent and an aqueous solvent, wherein the sol is translucent or transparent; and wherein the sol is stable for at least 1 month at room temperature and 2-8° C. In some embodiments, the sol is stable for at least 2, 3 or 4 months. Preferably, the sols will be stable for at least 5 or 6 months. In other embodiments, the sol is stable for at least 1 year or 2 years at room temperature and 2-8° C. In one embodiment, the titanium dioxide of the inventive sols is greater than 95% by weight in the amorphous form. In another aspect of the invention, the titanium dioxide is free of crystalline forms of titanium dioxide. In preferred embodiments, the titanium dioxide particles of the inventive sols have an average particle size of less than 10 nm or preferably less than 5 nm.

In one embodiment, the organic peptizing agent of the inventive sol is a mono-, di- or trialkyl amine base. The alkyl group of the amine base may be a linear or branched alkyl group. The amine bases include tert-butylamine, triethylamine, isopropylamine, diisopropoylethylamine, isobutylamine and isoamylamine.

In another embodiment, the titanium dioxide sol comprises an organic peptizing agent that is a carboxylic acid, including an alpha hydroxy carboxylic acid, a beta-hydroxy carboxylic acid or an alpha amino carboxylic acid. Exemplary carboxylic acid peptizing agents include lactic acid, tartaric acid, malic acid, citric acid and glycolic acid.

The inventive sols typically comprise between about 1% to about 25% titanium dioxide by weight. In some embodiments, the sols comprise between about 5% to about 15% titanium dioxide by weight, and preferably between about 8% to about 12% titanium dioxide by weight.

Also provided is a method for preparing a stable, transparent or translucent colloidal titanium dioxide sol comprising amorphous titanium dioxide, comprising:
(i) hydrolyzing a titanium dioxide precursor to form amorphous titanium dioxide particles having an average particle size of less than 50 nm;
(ii) isolating the amorphous titanium dioxide particles from step (i);
(iii) re-dispersing the amorphous titanium particles of step (ii) in a liquid medium to form a dispersion; and
(iv) treating the dispersion of step (iii) with an organic peptizing agent until the dispersion forms a transparent or translucent sol.

In one embodiment, the titanium dioxide precursor is a titanium tetraalkoxide compound, including titanium tetraisopropoxide, titanium-n-propoxide, titanium tetra-n-butoxide, titanium tetraethoxide, and titanium tetramethoxide.

In another embodiment of the method, the titanium dioxide precursor is a water-soluble titanium dioxide salt. When the titanium dioxide precursor is a water-soluble titanium dioxide salt, the process further comprises treating a solution of the water-soluble titanium dioxide salt with an ion-exchange resin to de-ionize the solution prior to hydrolyzing the titanium dioxide precursor.

The titanium dioxide precursor may be treated with a basic chelating agent prior to hydrolyzing. The basic chelating agent may be an dialkanolamine or a trialkanolamine such as triethanolamine.

In one aspect of the invention, the amorphous titanium dioxide particles are greater than 95% by weight in the amorphous form. Alternatively, the amorphous titanium dioxide particles are free of crystalline forms of titanium dioxide. Preferably, the amorphous titanium dioxide particles have an average particle size of less than 10 nm or less than 5 nm.

In one aspect of the method, the peptizing agent is a mono-, di- or trialkylamine, which may contain a linear or branched alkyl group, including tert-butylamine, triethylamine, isopropylamine, diisopropoylethylamine, isobutylamine and isoamylamine.

In another embodiment, the organic peptizing agent used in the inventive process is a carboxylic acid, including an alpha hydroxy carboxylic acid, a beta-hydroxy carboxylic acid or an alpha amino carboxylic acid. Particular carboxylic acid peptizing agents include lactic acid, tartaric acid, malic acid, citric acid and glycolic acid.

The method of forming the inventive sols may further comprise adjusting the pH of the sol with an acid or base to a desired pH. The inventive method produces inventive sols comprising amorphous titanium dioxide that are translucent or transparent and stable for extended periods of time.

These and other aspects of the present invention will be better understood by reference to the following detailed description and accompanying figures.

DETAILED DESCRIPTION

The present invention provides colloidal titanium dioxide sols comprising amorphous $TiO_2$ that are translucent or transparent and stable for extended periods of time. The inventive sols are useful in a variety of binding applications including as particulate binders, in surface coating applications and in printing applications.

Titanium dioxide is less frequently used in binding applications than other binder materials because it most typically exists in crystalline form rather than as an amorphous solid. For example, $SiO_2$ is used more frequently as a particulate binder in catalyst applications. Amorphous solids contain a high concentration of surface hydroxyl groups and therefore have a lager amount of surface active groups for binding purposes. Titanium dioxide, however, is more chemically stable than $SiO_2$, is photoactive and more catalytically active than $SiO_2$, which is useful in certain applications. Therefore, the stable, transparent sols comprising amorphous titanium dioxide of the present invention are very useful in many applications.

Some publications describe $TiO_2$ sols as dispersions of titanium dioxide in liquid medium where the dispersion is not translucent or transparent. The titanium dioxide sols of the present invention are distinguished from these dispersions in that they are completely transparent or translucent for extended periods of time. The inventive sols are usually stable for at least 1 month without forming discernable solids in the mixture. Typically, the sols are stable for at least 2 months or 3 months at room temperature and 2-8° C. without the formation of solids. More typically, the sols are stable for at least 4 months, 5 months or 6 months. In some embodiments, the sols are stable for at least 1 year or 2 years at room temperature or 2-8° C. without forming discernable solids in the mixture.

DEFINITIONS

All terms used herein are intended to have their ordinary meaning unless otherwise provided.

The term "alkyl" is intended to have its customary meaning, and includes straight, branched, or cyclic, primary, secondary, or tertiary hydrocarbon.

The term "aryl" is intended to have its customary meaning, and includes any stable monocyclic, bicyclic, or tricyclic carbon ring(s) comprising up to 8 members in each ring (typically 5 or 6), wherein at least one ring is aromatic as defined by the Huckel 4n+2 rule, and includes phenyl, biphenyl, or naphthyl.

The term "heteroaryl" is intended to have its customary meaning, and includes heteroaromatic ring groups having five to fourteen members.

The term "titanium dioxide precursor", as used herein, means any compound that includes titanium and forms $TiO_2$ in any form when subjected to the processing steps described.

The term "stable $TiO_2$ sol" as used herein, means a $TiO_2$ sol that does not form visible solids or otherwise substantially change properties during storage, including its translucent or transparent appearance. The stability of the sols is determined visually.

The term "room temperature" is intended to mean a temperature range of 20-25° C.

The titanium dioxide sols of the invention are prepared by forming titanium dioxide particles, preferably in amorphous form, with an average particle size of less than about 50 nm, and then dispersing the precipitated titanium dioxide in a liquid medium and treating the mixture with a peptizing agent to form a translucent or transparent mixture.

In the first step amorphous titanium dioxide particles with an average particle size of less than about 50 nm are produced by any suitable precipitation method, including, but not limited to, hydrolysis of a $TiO_2$ precursor, pH adjustment of a water soluble titanium salt and introduction of an anti-solvent. There is no limit to the concentration of the $TiO_2$ precursor solution prior to precipitation of the $TiO_2$ as long as the precursor remains in solution prior to conversion into $TiO_2$ and produces $TiO_2$ particles of the required particle size and morphology. In a preferred embodiment, controlled hydrolysis of a $TiO_2$ precursor compound in an aqueous solvent forms amorphous $TiO_2$ of suitable particle size. An aqueous solvent includes any suitable solvent or solvent mixture that comprises water to hydrolyze the $TiO_2$ precursor and produce $TiO_2$. Typically, water alone or water mixed with a small quantity of an organic solvent to facilitate the solubility of the titanium dioxide precursor will be used. Mixtures of water and an organic solvent may also serve to control the rate of hydrolysis of the $TiO_2$ precursor and the precipitation of $TiO_2$. If organic solvents are used, the solvents will typically be miscible with water or will have sufficient solubility for water so that sufficient water will be available to hydrolyze the $TiO_2$ precursor to $TiO_2$. Suitable organic solvents include alcohols such as methanol, ethanol, isopropanol and the like; amides such as dimethylformamide and dimethylacetamide and the like; and sulfoxides such as dimethylsulfoxide.

In some embodiments, the $TiO_2$ precursor is mixed with an organic solvent, such as an alcohol, and added to water to achieve hydrolysis of the $TiO_2$ precursor. As the $TiO_2$ precursor is hydrolyzed, it forms $TiO_2$ which precipitates as amorphous $TiO_2$ particles with an average particle size of less than about 50 nm. In another embodiment, the $TiO_2$ precursor is mixed with a chelating base to form a chelated titanium species and the mixture is then added to water to hydrolyze the $TiO_2$ precursor and precipitate amorphous $TiO_2$.

In one embodiment, the $TiO_2$ precursor is an organotitanium compound. Suitable organotitanium compounds include, but are not limited to, titanium alkoxides of the general structure $Ti(OR)_4$ where each R is independently alkyl, aryl or heteroaryl; titanium acyl compounds such as titanyl acetylacetonate and the like. Preferred titanium alkoxides include titanium tetraisopropoxide, titanium tetra-n-propoxide, titanium tetraethoxide, titanium tetramethoxide, titanium tetra-n-butoxide and titanium tert-butoxide and the like. Mixed titanium alkoxides, where the R groups in $Ti(OR)_4$ may be different, are also contemplated as $TiO_2$ precursors in the present invention. Other suitable organic titanium compounds include titanium (IV) amine compounds such as tetrakis(dimethylamino)titanium, tetrakis(diethylamino)titanium and the like. As described above, the organotitanium $TiO_2$ precursor is hydrolyzed by introduction of a minimum amount of water which results in precipitation of $TiO_2$ particles from solution. Depending on the process used, the organotitanium $TiO_2$ precursor may be first treated with a chelating compound and then mixed with an aqueous solvent to affect hydrolysis of the precursor, or the organotitanium $TiO_2$ precursor will be simply brought into solution with an organic solvent and then mixed with an aqueous solvent to form $TiO_2$.

Titanium halides represented by the formula $TiX_4$, where X is chloro, bromo, iodo or fluoro, or mixtures thereof, may also be used as $TiO_2$ precursors. The present invention also contemplates the use of organotitanium halides such as chlorotitanium triisopropoxide ($Ti(O-i-Pr)_3Cl$) and the like as $TiO_2$ precursors. Organotitanium di- and tri-halides are also contemplated. Although not being bound by theory, when titanium halides are used as $TiO_2$ precursors, the halides are typically first hydrolyzed in a controlled fashion to a less reactive species such as titanium oxyhalide (i.e. titanium oxychloride and the like). The resulting intermediate titanium species may then be further hydrolyzed to $TiO_2$ by adjusting the pH of the solution.

In another aspect of the invention, the $TiO_2$ precursor may be a water-soluble titanium salt. Suitable titanium salts include, but are not limited to, titanium oxychloride, titanyl sulfate, titanium oxynitrate and the like. Precipitation of $TiO_2$ from water-soluble salts may be affected by adjusting the pH of the solution to a pH where the water soluble titanium salt will hydrolyze and form $TiO_2$, which precipitates from solution. Typically, this is accomplished by raising the pH of the solution with addition of a base.

Any base known to those in the art that will increase the pH of the water solution of the water-soluble titanium salt may be used to precipitate $TiO_2$, including inorganic and organic bases. Suitable bases include, but are not limited to, amine bases including as ammonium hydroxide, mono-, di- or tri-alkylamines such as triethylamine, diisopropylethylamine and the like; cyclic amine bases such as N-ethylmorpholine, piperidine, pyrrolidine and the like; hydroxides or alkoxides of alkali metals or alkaline earth elements such as sodium, lithium, potassium hydroxide, magnesium hydroxide, calcium hydroxide; sodium, lithium or potassium alkoxides such as methoxide, ethoxide, butoxide, t-butoxide and the like; carbonate and bicarbonate bases such as sodium, lithium or potassium carbonate and bicarbonate and the like. It will be apparent to skilled persons that the type of base is not limited to the bases described above and that there are many other bases that may be used to adjust the pH of the solution of water-soluble titanium salt.

Alternatively, the $TiO_2$ may be precipitated from solution by changing the composition of the solvent so that the $TiO_2$ is no longer soluble. In this embodiment, a $TiO_2$ precursor which is in solution in a suitable solvent may be added to a second "anti-solvent" in which the precursor is not soluble. For example, this may be achieved by adding a $TiO_2$ precursor in a water-miscible organic solvent such as acetone or higher alcohols to water. Alternatively, the precipitation may be accomplished by adding a water-miscible organic solvent to an aqueous solution of the water soluble $TiO_2$ salt to lower the solubility of $TiO_2$. The titanium precipitate formed may be used in the next step of the process, whether it is partially hydrolyzed or fully hydrolyzed to $TiO_2$.

In certain aspects of the invention, the controlled hydrolysis or controlled precipitation of the $TiO_2$ precursor is achieved by treating the $TiO_2$ precursor with a chelating agent, which forms stable chelate bonds with titanium in aqueous solution, prior to hydrolysis of the $TiO_2$ precursor and precipitation of $TiO_2$. Using the chelating agents, the rate of hydrolysis or precipitation of the $TiO_2$ precursor in water may be controlled, thereby controlling the particle size of the $TiO_2$ particles formed. Any chelating agent that will form a stable chelate bond with titanium in aqueous media may be used, including neutral organic compounds and organic acids or bases.

Typically, compounds that are good chelating agents include two or more functional groups that may chelate to the titanium. Suitable neutral chelating agents include dicarbonyl compounds such as a diketone, a diester, a ketoester and the like. Diketone chelators include 2,4-pentanedione, 1,4-hexanedione, 1,3-pentanedione, 2,4-hexanedione, and dipivaloyl methane. Diester chelators include mono or di-alkyl esters of dicarboxylic acids. Suitable diesters include dialkyl malonates, such as dimethyl and diethylmalonates and the like. Ketoester chelators include, but are not limited to, alkyl acetoacetates such as methyl acetoacetate, ethyl acetoacetate, isopropyl acetoacetate, butyl acetoacetate and the like. Mixtures of two or more dicarbonyl chelators may also be used to prepare the inventive sols.

In addition to dicarbonyl compounds, compounds that comprise two different functional groups on the same molecule within close proximity are also suitable chelators. Examples of these types of chelating compound include alpha hydroxy acids and alpha amino acids. When a chelating agent is chiral, either enantiomer of the chiral compound can be used or the racemic mixture can be used. Suitable alpha hydroxy acids include, but are not limited to, lactic acid, tartaric acid, malic acid, citric acid and the like. Any naturally occurring or synthetic alpha amino acid may be used to produce the sols of the invention. For example, the twenty naturally occurring L-alpha amino acids may used. The corresponding D-alpha amino acids or the D,L-racemic mixture may also be used. Also contemplated for use with the present invention are synthetic amino acids with non-natural side chains.

Base chelators include organic bases that comprise two or more functional groups that are able to chelate to the titanium atom. Suitable chelating agents include dialkanolamines and trialkanolamines such as diethanolamine, triethanolamine and the like. Other suitable chelating bases with two or more functional groups include ethylenediamine, diethylenetriamine, triethylenetetramine, 2,2'-bipyridine, 1,10-phenanthroline, ethylenediaminetetraacetic acid or -tetraacetate, ethylenediaminetriacetic acid or -triacetate, 2,2',2"-terpyridine, 1,4,7-triazacyclononane, tris(2-aminoethyl)amine, and the like.

In one embodiment where an organic acid is used as a peptizing agent, the $TiO_2$ precursor is not treated with a chelating agent prior to precipitation of the $TiO_2$.

In another embodiment, when an organic base is used as a peptizing agent, the $TiO_2$ precursor is typically treated with a suitable organic base chelating agent that is capable of chelating titanium prior to precipitation of the $TiO_2$ particles. Addition of a chelating base to the $TiO_2$ precursor will result in a more stable species prior to precipitation, and will reduce the degree of hydrolysis and facilitate the peptization of the titanium particles in the next step. In one embodiment, the base used to treat the $TiO_2$ precursor is the same base used as a peptizing agent. Preferably, the amount of chelating base added to the $TiO_2$ precursor is such that the molar ratio of base to titanium is $\leq 0.5:1$. In other embodiments, the molar ratio of base to titanium is $\leq 0.3$ or $0.2:1$.

When a soluble titanium salt is used as a $TiO_2$ precursor and an organic base is used as a peptizing agent, a de-ionizing step is typically used to reduce the concentration of ions present in the $TiO_2$ precursor prior to the precipitation step. Lowering the concentration of the ions in the solution facilitates the chelation of the titanium with chelating agents. Any method that will reduce the level of ions in the soluble titanium salt solution may be used, including treatment with an anion exchange resin, precipitation of insoluble salts, and the like. In one embodiment, the $TiO_2$ precursor solution is treated with an anionic ion exchange resin to remove excess ions that may be in the $TiO_2$ precursor solution such as sulfate ions, chloride ions, and the like, depending on the nature of the soluble titanium precursor salt. When the soluble titanium salt solution is treated with an ion exchange resin, the pH of the solution will typically increase over time and may result in the formation of a $TiO_2$ precipitate. Preferably, the treatment time of the soluble titanium salt with an anion exchange resin will be limited so that the pH of the solution is maintained at less than about 3 to prevent formation of a $TiO_2$ precipitate. More preferably, the de-ionization treatment will be limited so that the pH of the solution is maintained at less than about 2. Once the level of ions is reduced, the titanium salt solution is separated from the ion exchange resin and treated with a base that is capable of forming a chelating bond, as described above. The pH of the solution of the chelated titanium dioxide salt is then adjusted with a suitable base to form $TiO_2$ which precipitates from solution.

The precipitated $TiO_2$ may be collected by any suitable means including decanting, centrifugation and filtration. The isolated solid may optionally be washed with water to remove byproducts of the hydrolysis reaction and other impurities prior to the peptization step.

In the next step, the precipitated $TiO_2$, which is preferably in amorphous form, is dispersed in a liquid medium and treated with a peptizing agent with agitation to form the inventive sols. The dispersed $TiO_2$ may be treated with the peptizing agent at room temperature or elevated temperatures with agitation until the dispersion forms a transparent or translucent mixture. Elevated temperatures normally accelerate the peptizing process. Room temperature is preferred when the peptizing agent is an organic base, while elevated temperatures are typically used when the peptizing agent is an organic acid. When the peptizing process is conducted at an elevated temperature, a temperature range of between about 30° C. to about 100° C. is typically used. More typically, the peptizing temperature is between about 40° C. to about 100° C. or between about 60° C. to about 100° C.

The concentration of the $TiO_2$ in the dispersing liquid will determine the initial concentration of the sol after peptization. Of course, the inventive $TiO_2$ sols can be further diluted or concentrated, if desired, after the peptization step is complete. Typically, a $TiO_2$ dispersion of about 1% to about 30% of $TiO_2$ by weight in an aqueous solvent will be used for the peptization step. The aqueous solvent may be any solvent or solvent mixture that comprises water. For example, mixtures of water and a water-miscible solvent such as an alcohol may be used. More typically, the concentration of the dispersion is from about 2% to about 15% or between about 5% to about 15% by weight of the mixture. Preferably, the concentration is between about 8% to about 12% or about 5% to about 10% by weight.

Many organic acids and bases are suitable for use as peptizing agents with the present invention. Preferred acidic peptizing agents include carboxylic acids that are substituted with one or more functional groups including, but not limited to, hydroxy, alkoxy, amino, mono- or dialkylamino, carboxyl, carboxylic acid esters, carbamoyl, amido, urea, thiol, sulfide, disulfide, sulfoxide, sulfone, and the like. Preferably, the carboxylic acid peptizing agents will be substituted at the alpha or beta carbon with a second functional group. These peptizing agents include, but are not limited to, alpha-hydroxy carboxylic acids, beta-hydroxy carboxylic acids, alpha-alkoxy carboxylic acids and alpha-amino carboxylic acids. When a chelating agent has an asymmetric carbon and is chiral, either enantiomer of the chiral compound can be used or the racemic mixture can be used.

Preferred alpha hydroxy carboxylic acids include, but are not limited to, lactic acid, tartaric acid, malic acid, citric acid, glycolic acid, 2-hydroxyisobutyric acid, 2-hydroxy-2-methylbutyric acid, 2-ethyl-2-hydroxybutyric acid, 2-hydroxy-3-methylbutyric acid, 2-hydroxyisocaproic acid, 3-hydroxybutyric acid, 2,2-bis(hydroxymethyl)propionic acid, citramalic acid, 3-hydroxy-3-methylglutaric acid, gluconic acid, 2-isopropylmalic acid, mucic acid, dihydrofumaric acid, quinic acid, methoxyacetic acid, ethoxyacetic acid, and the like.

Any naturally occurring or synthetic alpha amino acid may be used to produce the inventive sols. For example, the twenty naturally-occurring L-alpha amino acids may used. The corresponding D-alpha amino acids may also be used. Also contemplated for use with the present invention are synthetic alpha-hydroxy carboxylic acids and alpha-amino acids with non-natural side chains.

A wide variety of alkaline peptizing agents may be used in the present invention including mono-, di- or trialkylamines; mono-, di- or triarylamines; organic bases with two or more functional groups such as dialkanolamines and trialkanolamines and the like. Mono-, di- or trialkylamine peptizing agents may comprise linear, branched or cyclic alkyl groups. Suitable amines include, but are not limited to, mono-, di- or trimethyl amine; mono-, di- or triethylamine; mono-, di- or tripropylamine; mono-, di- or tributyl amine, sec-butylamine, isobutylamine, isopropylamine, isoamylamine, tert-amylamine, 2-methylbutylamine, 1-methylbutylamine and the like. Amines with cyclic alkyl groups include cyclopropylamine, cyclobutylamine, cyclopentylamine, cyclohexylamine, cycloheptylamine and cyclooctylamine as well as their di- and tri-alkyl derivatives. Of course, amines with different alkyl groups such as diisopropylethylamine, ethylbutylamine, methylethylamine, and the like, may be used. Also contemplated are cyclic amines such as pyrrolidine, piperidine, morpholine, and the like, as well as their N-alkyl derivatives. Preferably, bulky mono-, di- or trialkyl amines such as tert-butylamine, triethylamine, propylamine, dipropylamine, diisopropylethylamine, and the like, are used as basic peptizing agents. As noted above, when basic peptizing agents are used, the peptizing process is preferably conducted at room temperature, which is intended to mean between about 20° C. to 25° C. In other embodiments, the peptization with basic peptizing agents is conducted between about 20° C. to about 30° C., or between about 25° C. to about 30° C.

After peptization of the $TiO_2$, the pH of the sol may be adjusted to a neutral pH or other desired pH range using any commonly used inorganic or organic acid or base. Sols that comprise basic peptizing agents are preferably kept at a pH of between about 6-8. Sols that comprise carboxylic acid peptizing agents are typically kept at a pH of between 3-10.

The stable, transparent or translucent $TiO_2$ sols will contain about 1% to about 30% of $TiO_2$ by weight in an aqueous solvent. More typically, the sols will contain from about 2% to about 15% or between about 5% to about 15% titanium dioxide by weight. Preferably, the sols will contain between about 8% to about 12% or about 5% to about 10% $TiO_2$ by weight of the mixture.

Any form of titanium dioxide may be used in the titanium dioxide sols of the invention, including amorphous form, rutile or anatase form. Furthermore, mixtures of amorphous form, rutile or anatase form. Preferably, the titanium dioxide particles used in the inventive sols is preferably predominantly in amorphous form. The amorphous form of titanium dioxide in sol applications is particularly useful because amorphous forms of $TiO_2$ contain a higher amount of surface hydroxyl groups which improves the ability of the $TiO_2$ to bind other elements. "Predominantly" means that the level of the titanium dioxide particles in the amorphous form is greater than about 80%, and more preferably greater than about 90% or greater than about 95% of the particles in the inventive sols. In some embodiments, the titanium dioxide particles of the compositions will be in substantially pure amorphous form, meaning that the content of the amorphous form is greater than 97%, and more preferred still, greater than 98% by mass. In some preferred embodiments, the amorphous dioxide particles will be free of crystalline forms of titanium dioxide, including the rutile and anatase forms, meaning that the crystalline forms are not detectable by crystallography. Put another way, the titanium dioxide sols may comprise 100% amorphous titanium dioxide The degree of crystallization and the nature of the crystalline phase are measured by X-ray diffraction. The absence of characteristic diffraction pattern peaks for the known crystalline forms of titanium dioxide in terms of the angular positions (two theta) indicates that 100% of the titanium dioxide is in the amorphous form, within the limit of the analytical technique.

The average particle size of the titanium dioxide used in the inventive sols will typically be less than about 50 nm. More typically, the average particle size of the titanium dioxide particles will be less about 30 nm, 20 nm or 10 nm. In a preferred embodiment, the particle size of the titanium dioxide in the sols will be less than about 5 nm. Reference herein to the size of titanium dioxide particles will be understood to mean the average particle size of the titanium dioxide particulates. Where the particle size is modified by the term "about," it will be understood to embrace somewhat larger or smaller particles sizes than the indicated value to account for experimental errors inherent in the measurement and variability between different methodologies for measuring particle size, as will be apparent to one skilled in the art. The diameters may be measured by standard particle size analysis techniques, for example, transmission electron microscopy (TEM) or by light scattering techniques (dynamic light scattering, Malvern Instruments Ltd., U.K.).

Alternatively, the particles may be characterized by surface area. Typically, the titanium dioxide used in the inventive sols will have a surface area, as measured by any suitable method, including 5-point BET on a dried sample, of greater than about 20 $m^2/g$. More typically, the photocatalytic titanium dioxide particles have surface areas of greater than about 50 $m^2/g$ or greater than about 70 $m^2/g$. In more preferred embodiments, the titanium dioxide particles have surface areas greater than about 100 $m^2/g$, and preferably greater than about 150 $m^2/g$. In some embodiments, the titanium dioxide particles will have a surface area greater than about 200 $m^2/g$, greater than about 250 $m^2/g$, or even greater than about 300 $m^2/g$.

EXAMPLES

The following examples are presented to aid in an understanding of the present invention and are not intended to, and should not be construed to, limit the invention in any way. All alternatives, modifications and equivalents that may becomes obvious to those of ordinary skill in the art upon a reading of the present disclosure are included within the spirit and scope of the invention.

Example 1

3000 grams of titanium (IV) isopropoxide (Alfa Aesar, 95%) in a large plastic beaker was mixed with 600 grams of triethanolamine (Alfa Aesar, 98%) for about 15 minutes under mild agitation. The solution became warm during the mixing process, indicating the formation of a titanium-triethanolamine complex. The resulting mixture comprising titanium-triethanolamine was added at a flow rate of about 100 g/minute to a second beaker containing 15 L of deionized water with generous agitation, resulting in the precipitation of $TiO_2$ in amorphous form. The resulting mixture was mixed for an additional 30 minutes after completion of the addition, and the mixture was allowed to settle for 48 hours. The upper liquid layer of the sample was then decanted. The remaining solid was re-dispersed in water with agitation for 15 minutes. Tert-butylamine (Alfa Aesar, 98%) was added to the dispersed mixture at room temperature. The mixture was agitated with mild stirring until peptization was complete and the mixture became transparent. A small amount of glycolic acid (Alfa Aesar, 70%) was added dropwise with stirring to the peptized mixture to adjust the pH from about 10 to 7.5.

Approximately 2 gallons of transparent, yellowish colored, amorphous titanium dioxide sol were prepared with this method. The concentration of titanium dioxide was determined gravimetrically to be about 10%. The sol was found to be stable for at least 6 months at room temperature as well as in a refrigerator (2-8° C.) at a pH of between 6.5-8.

Example 2

250 grams of $TiO(SO_4)$ solution (Millennium Inorganic Chemicals, 7.9 wt. % in $TiO_2$) was diluted with 150 g of deionized water. To this solution, a total of 400 grams of anion exchange resin (Dowex Monosphere™ 550A OH Form) was added in approximately 25 gram portions every 5 minutes under constant agitation. After addition of the anion exchange resin, the mixture was stirred for another 60 minutes and then the solution was separated from the resin spheres by filtration. The filtered solution was then mixed with 40 grams of triethanolamine (chelator). At this point, the solution was still clear. An ammonia solution (Fisher, 29%) was added to the clear solution slowly with agitation until the pH was approximately 7, which resulted in precipitation of amorphous $TiO_2$. The resulting precipitate was allowed to mix for another 30 minutes and then filtered. The filtered solid was washed with approximately 400 g of deionized water. The wet filter cake was re-dispersed in deionized water to a total weight of 400 g. To this dispersion was added 8 grams of tert-butylamine, and the mixture was slowly stirred for about 8 hours to produce a transparent amorphous $TiO_2$ sol. The mixture was adjusted to a pH of 7.5 with glycolic acid. About 400 grams of transparent sol was produced by this method, which contained 7.5 wt. % amorphous $TiO_2$ as was stable for at least six months at room temperature and 2-8°, at a pH of between 6.5-8.

Example 3

225 grams of titanium (IV) isopropoxide was mixed with 225 grams of isopropanol (Fisher, 99.9%). The mixture was slowly added to 1,125 grams of water with vigorous stirring, resulting in the formation of a precipitate. The precipitate was filtered and the filter cake washed 4 times with about 1200 g of water the wet filter cake was re-dispersed in deionized water such that the total weight of the dispersion was 600 g. 30 grams of D,L-lactic acid (Alfa Aesar, 85-90%) was added to the slurry, and the mixture was heated to reflux for three hours, after which it became transparent. The resulting sol was cooled and adjusted to a pH of 7 with tert-butylamine. The transparent amorphous $TiO_2$ sol contained about 10% $TiO_2$ by weight and was stable for at least 6 months at room temperature and 2-8° C., at a pH of between 3-10.

What is claimed is:

1. A stable colloidal titanium dioxide sol comprising titanium dioxide particles dispersed in an aqueous solution comprising an organic peptizing agent which is a mono-, di- or trialkyl amine base, said titanium dioxide particles being amorphous and having an average particle size of less than about 50 nm, wherein the sol is transparent and stable for at least 1 month at room temperature.

2. The titanium dioxide sol of claim 1, wherein the titanium dioxide particles have an average particle size of about less than 10 nm.

3. The titanium dioxide sol of claim 1, wherein the titanium dioxide particles have an average particle size of about less than 5 nm.

4. The titanium dioxide sol of claim 1, wherein the mono-, di- or trialkylamine comprises a branched alkyl group.

5. The titanium dioxide sol of claim 1, wherein the amine base is selected from the group consisting of tert-butylamine, triethylamine, isopropylamine, diisopropylethylamine, isobutylamine and isoamylamine.

6. The titanium dioxide sol of claim 1, wherein the sol comprises between about 5% to about 15% titanium dioxide by weight.

7. The titanium dioxide sol of claim 1, wherein the sol comprises between about 8% to about 12% titanium dioxide by weight.

8. The titanium dioxide sol of claim 1, wherein the sol is stable for at least 3 months at room temperature.

9. The titanium dioxide sol of claim 1, wherein the sol is stable for at least 6 months at room temperature.

10. The titanium dioxide sol of claim 1, wherein the sol is stable for at least 1 year at room temperature.

11. The titanium dioxide sol of claim 1, wherein the sol is stable for at least 2 years at room temperature.

12. The titanium dioxide sol of claim 1, wherein the sol is stable for at least 1 month at 2-8° C.

13. The titanium dioxide sol of claim 1, wherein the sol is stable for at least 3 months at 2-8° C.

14. The titanium dioxide sol of claim 1, wherein the sol is stable for at least 6 months at 2-8° C.

15. The titanium dioxide sol of claim 1, wherein the sol is stable for at least 1 year at 2-8° C.

16. The titanium dioxide sol of claim 1, wherein the sol is stable for at least 2 years at 2-8° C.

17. A method for preparing a stable, transparent colloidal titanium dioxide sol comprising amorphous titanium dioxide, comprising:
(i) obtaining a solution of a titanium dioxide precursor compound;
(ii) hydrolyzing the titanium dioxide precursor compound to form titanium dioxide,
wherein the titanium dioxide precipitates from the solution as amorphous titanium dioxide particles having an average particle size of less than 50 nm;
(iii) isolating the amorphous titanium dioxide particles from step (ii);
(iv) forming a dispersion of the amorphous titanium particles of step (iii) in a liquid medium; and
(v) treating the dispersion of step (iv) with an organic peptizing agent to form a stable, transparent or translucent sol comprising amorphous titanium dioxide particles, wherein the peptizing agent is a mono-, di- or trialkylamine.

18. The method of claim 17, wherein the titanium dioxide precursor is a titanium tetraalkoxide.

19. The method of claim 18, wherein the titanium tetraalkoxide is selected from the group consisting of titanium tetraisopropoxide, titanium-n-propoxide, titanium tetra-n-butoxide, titanium tetraethoxide, and titanium tetramethoxide.

20. The method of claim 17, wherein titanium dioxide precursor is a water-soluble titanium salt.

21. The method of claim 20, further comprising treating a solution of the water-soluble titanium salt with an ion-exchange resin to de-ionize the solution prior to hydrolyzing the titanium dioxide precursor.

22. The method of claim 17 or 21, wherein the titanium dioxide precursor is treated with a basic chelating agent prior to hydrolyzing.

23. The method of claim 22, wherein the basic chelating agent is a dialkanolamine or a trialkanolamine.

24. The method of claim 23, wherein the chelating agent is triethanolamine.

25. The method of claim 17, wherein the amorphous titanium dioxide is free of crystalline forms of titanium dioxide.

26. The method of claim 17, wherein the amorphous titanium dioxide particles have an average particle size of about less than 10 nm.

27. The method of claim 17, wherein the amorphous titanium dioxide particles have an average particle size of about less than 5 nm.

28. The method of claim 17, wherein the mono-, di- or trialkylamine is selected from the group consisting of tert-butylamine, triethylamine, isopropylamine, diisopropoylethylamine, isobutylamine and isoamylamine.

29. The method of claim 17, further comprising adjusting the pH of the sol with an acid or base.

* * * * *